United States Patent
Vanderpool et al.

(10) Patent No.: US 11,860,707 B2
(45) Date of Patent: *Jan. 2, 2024

(54) CURRENT PREDICTION-BASED INSTRUCTION THROTTLING CONTROL

(71) Applicant: International Business Machines Corporation, Armonk, NY (US)

(72) Inventors: Brian Thomas Vanderpool, Byron, MN (US); Gerald Mark Grabowski, Kellogg, MN (US); Jeffrey A. Stuecheli, Austin, TX (US); Michael Stephen Floyd, Cedar Park, TX (US); Matthew A. Cooke, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,274

(22) Filed: Feb. 15, 2023

(65) Prior Publication Data

US 2023/0195202 A1 Jun. 22, 2023

Related U.S. Application Data

(63) Continuation of application No. 17/460,163, filed on Aug. 28, 2021, now Pat. No. 11,625,087.

(51) Int. Cl.
*G06F 1/32* (2019.01)
*G06F 1/3234* (2019.01)
*G06F 1/3206* (2019.01)

(52) U.S. Cl.
CPC .......... *G06F 1/3243* (2013.01); *G06F 1/3206* (2013.01)

(58) Field of Classification Search
CPC ............................ G06F 1/3243; G06F 1/3206
See application file for complete search history.

(56) References Cited

U.S. PATENT DOCUMENTS

| | | | |
|---|---|---|---|
| 8,214,663 | B2 | 7/2012 | Floyd |
| 8,635,483 | B2 | 1/2014 | Acar |
| 10,409,354 | B2 | 9/2019 | Tagata |
| 2006/0288241 | A1 | 12/2006 | Felter |
| 2008/0263373 | A1 | 10/2008 | Meier |
| 2013/0151869 | A1 | 6/2013 | Steinman |
| 2016/0048188 | A1 | 2/2016 | Kim |
| 2019/0041942 | A1 | 2/2019 | Keceli |
| 2019/0086982 | A1 | 3/2019 | Priyadarshi |
| 2019/0369694 | A1 | 12/2019 | Diamond |

OTHER PUBLICATIONS

Cebrian et al., "Managing Power Constraints in a Single-Core Scenario Through Power Tokens," The Journal of Supercomputing 68, No. 1, 2014, pp. 414-442.

(Continued)

*Primary Examiner* — Stefan Stoynov
(74) *Attorney, Agent, or Firm* — Richard B. Thomas

(57) ABSTRACT

A system and method for managing energy consumption of one or more processor cores in a multicore processing device. The method includes translating each activity level of the one or more processor cores to a respective charge value. The method also includes generating, at least partially subject to each translated charge value, one or more charge replenishment requests associated with the one or more processor cores. The method further includes transmitting the one or more charge replenishment requests to a pending queue prior to a delay queue.

20 Claims, 11 Drawing Sheets

(56) References Cited

OTHER PUBLICATIONS

Jayaseelan et al., "A Hybrid Local-Global Approach for Multi-Core Thermal Management," ICCAD 2009, ACM, Nov. 2-5, 2009, 7 pages.
List of IBM Patents or Patent Applications Treated as Related, signed 2023, 2 pages.
Liu et al., "FastCap: An Efficient and Fair Algorithm for Power Capping in Many-Core Systems," 2016 IEEE International Symposium on Performance Analysis of Systems and Software (ISPASS), Mar. 3, 2016, pp. 57-68.
Shen et al., "Power Containers: An OS Facility for Fine-Grained Power and Energy Management on Multicore Servers," ASPLOS '13, ACM, 2013, 12 pages.
Tavana et al., "ElasticCore: A Dynamic Heterogeneous Platform With Joint Core and Voltage/Frequency Scaling," IEEE Transactions on Very Large Scale Integration (VLSI) Systems 26, No. 2, 2017, pp. 249-261.
Vanderpool et al., "Current Prediction-Based Instruction Throttling Control," U.S. Appl. No. 17/460,163, filed Aug. 28, 2021.
Vanderpool et al., "Proxy-Based Instruction Throttling Control," U.S. Appl. No. 17/460,162 iled Aug. 28, 2021.

CURRENT PREDICTION-BASED INSTRUCTION THROTTLING CONTROL

BACKGROUND

The present disclosure relates to charge management of one or more processor cores, and, more specifically, to managing charge consumption of the one or more processor cores through digital power proxy data and the respective charge consumption determinations.

Many known modern processing devices include multiple cores that are powered through a steady-state power source. As the processing loads on the cores vary, the supply voltage to the cores may dip, i.e., droop as a result of increased loading on one or more of the cores, thereby creating an environment conducive to microarchitectural processor stall events.

SUMMARY

A system and method are provided for charge management of one or more processor cores.

In one aspect, a computer system is provided for charge management of one or more processor cores in a multicore processing device. The system includes a hardware-based control system that includes one or more power proxy modules. Each power proxy module of the one or more power proxy modules is configured to translate an activity level of the one or more processor cores to a respective charge value. The system also includes one or more charge value accumulators. Each charge value accumulator of the one or more charge value accumulators is communicatively coupled to a respective power proxy module. Each charge value accumulator is configured to accumulate the charge values from the respective power proxy module and generate, at least partially subject to the accumulated charge values, one or more charge replenishment requests associated with the respective one or more processor cores. The system further includes a delay queue configured to receive the one or more charge replenishment requests, wherein the delay queue is operably coupled to the one or more charge value accumulators. The system also includes a pending queue configured to receive the charge replenishment requests prior to the delay queue, wherein the pending queue is communicatively coupled to the delay queue.

In yet another aspect, a computer-implemented method is provided for charge management of one or more processor cores management of one or more processor cores. The method includes translating an activity level of the one or more processor cores to a respective charge value. The method also includes generating, at least partially subject to each translated charge value, one or more charge replenishment requests associated with the one or more processor cores. The method further includes transmitting the one or more charge replenishment requests to a pending queue prior to a delay queue.

The present Summary is not intended to illustrate each aspect of every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
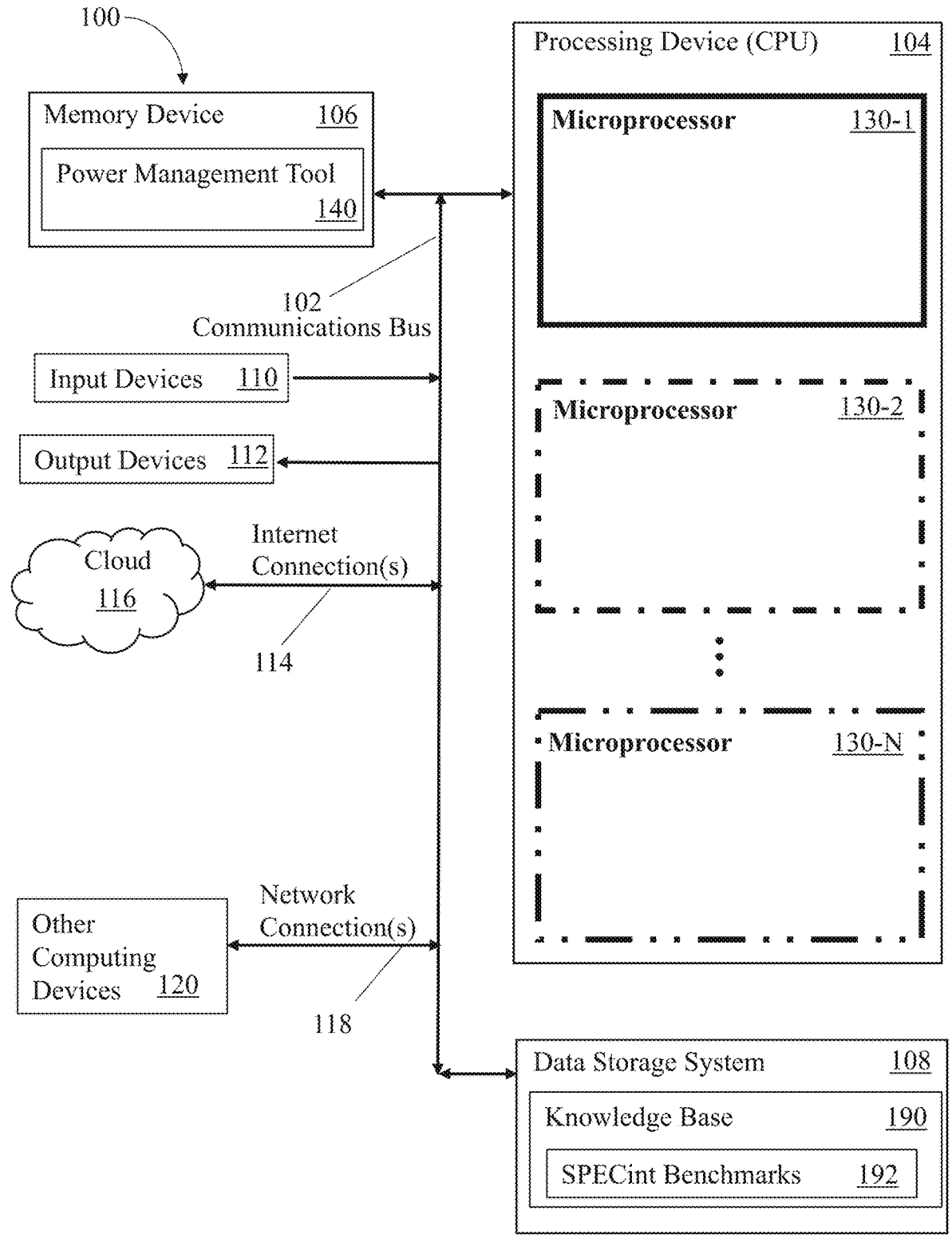
FIG. 1 is a block schematic diagram illustrating a computer system, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to charge management of one or more processor cores. While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known modern processing devices, sometimes referred to as central processing units, or CPUs, are positioned on a single chip (or die, where the terms are used interchangeably herein) as an integrated circuit. Many of these known CPUs are multicore processors, i.e., a computer processor on a single integrated circuit, or chip, with two or more separate processing units, called cores, each of which reads and executes program instructions. In some embodiments, such multicore processors include in excess of 32 cores. These multiple cores may be powered through a steady-state power source, e.g., in some embodiments, one or more Voltage Regulator Modules (VRMs). As the processing loads on the cores vary, a sudden change in the core activity of a computer processor can result in a relatively large increase in the current drawn from the power source, i.e., the VRMs. Such large current transients drawn from the VRMs may approach or exceed the ratings of the respective VRMs, which may induce a voltage droop in the computer processor due to inductive noise therein. Voltage droop refers to the reduction in available electric current in an electric circuit to process the present loading on one or more of the processing cores that is manifested as a reduction in the supply voltage to the cores. If the multiple cores in a multicore processor change from relatively low activity to relatively high activity in a relatively small interval of time, the voltage droop observed at all processor cores may be significant. In some situations, the voltage droop may be significant enough to exceed an established limit and thereby induce a microarchitectural stall event. Such a stall event is sometimes referred to as a pipeline stall, where the execution of instructions is delayed and, in some instances, the chip might shift into a non-functional state, i.e., potentially lead to a core shut-down event. Some large stall events have features including, without limitation, one or more operations that have extended latencies. Moreover, in certain circumstances, routine inducement of voltage droop conditions may reduce the functional life span of the integrated circuit.

In addition, many of the known multicore processors' cores are clocked at high frequencies, i.e., in some embodiments, frequencies in excess of 4 Gigahertz (GHz). The combination of the high frequencies and the increased population and density of the cores may induce heat generation such that, under certain circumstances, the total power demand of the multitude of cores may exceed the thermal capability of the heat removal features for the multicore processors to properly cool the microprocessor, where the functional lifespan of the integrated circuit may be reduced.

Furthermore, many of the known multicore processors cores are configured to maintain a predetermined value of electrical energy thereon in the form of charge, i.e., through a capacitance. The charge is used to facilitate providing the energy necessary for the inherent transistor switching and logic execution during short-term high demands in current supplied from the VRMs, resulting in a temporary voltage droop as described above. Such high current demand can be temporarily met by package or board capacitance until the VRM can replenish the charge. If the power draw is significant and sufficiently sustained to induce a voltage droop, i.e., an overcurrent condition, the microprocessor will need to react to mitigate any deleterious effects as described above.

In at least some of such known multiprocessors, there are a number of techniques to combat voltage droop (and the attendant charge depletions) and core temperature excursions. In some embodiments, features are present to decrease the clock frequency of the affected processor cores. In some embodiments, it is possible to trigger circuits that throttle (e.g., limit the instruction fetch rate from the typically adjacent L1 and L2 cache) the processor core through one or more throttle actions. Throttling the processor core can reduce how quickly the processor core executes instructions, thereby decreasing the rate of heat generation. In addition, throttling the processor core when voltage droop occurs can facilitate the core continuing to execute the respective instructions even with a reduced voltage. In this way, throttling the processor core can prevent the aforementioned conditions that may decrease the life expectancy of the respective integrated circuits. However, routine throttling of the processor cores directly affects the overall efficiency of the respective integrated circuit.

A system and method are disclosed and described herein for energy management of one or more processor cores of a multicore processor. Specifically, the system and method are directed toward executing charge management of the one or more processor cores. More specifically, the system and method are directed toward managing charge consumption of the one or more processor cores through digital power proxy data and the respective charge consumption determinations subject to such power proxy data. As used herein, the terms "energy" and "power" (energy per unit time) are used interchangeably. In some embodiments, the processor cores of the multicore processor are organized into groups of four cores per chiplet, i.e., quad core chiplets, or simply quad chiplets, where four is a non-limiting number. Therefore, for those multicore processors that include 32 processor cores, such processors include 8 quad chiplets.

In embodiments disclosed herein, each microprocessor core includes a digital power proxy that approximates the energy the processor core consumes in real-time. Each digital power proxy uses a weighted computation of core performance counters to produce an approximation of the power used by the core over a predefined interval for respective operations.

Additionally, in at least some embodiments, each processor core includes embedded dynamic power throttle logic to reduce core performance through limiting the instruction fetch rate by the core from the nearby cache, and/or limiting the number of in-flight instructions already present within the core. Activating these throttle mechanisms is a proven technique to reduce the instantaneous core power draw.

In many of the embodiments described herein, the finely-tuned core throttle state for each individual processor core is measured in the number of instructions per unit time (IPUT), e.g., instructions per second (IPS). The terms "throttle state"

and "throttling state" are used interchangeable herein. In some embodiments, the units of instructions per cycle (IPC) are used. In some embodiments, the individual increments extend to, for example, and without limitation, 256 IPUT. The throttling action, if required, may be increased or decreased in incremental units of 1 IPUT or multiple IPUT. In one or more embodiments, the target energy consumption (energy target) for each core is established based on empirically-derived values for the present and impending instructions. These empirically-derived values are based on at least the number of instructions for a particular task and the computing resources, including the energy consumption, that is necessary for executing the respective instructions. Specifically, the empirically-derived values are determined through a computer benchmark specification for CPU integer processing power. For example, a set of benchmarks designed to test the CPU performance of a modern server computer system includes, without limitation, SPECint (as maintained by the Standard Performance Evaluation Corporation (SPEC)), where SPECint is the integer performance testing component of the associated SPEC test suite. Using the SPECint benchmark, the power reduction in the core and respective L2 cache was measured for every SPECint sub-benchmark with a range of settings for exclusively instruction transmission rate throttling and in-flight instruction throttling. One or more statistical analyses were applied to produce a combined 64-entry table, i.e., an index of instruction fetch rate throttle settings and in-flight instruction throttle settings that map a substantially linear power savings to the throttle index, where the linearity is discussed further herein with respect to FIG. 5. The index of instruction fetch rate throttle settings and in-flight instruction throttle settings is referred to as the fine throttle index, sometimes referred to as the FTX. Accordingly, the SPECint benchmarks facilitated calibrating a power savings for each throttle setting, i.e., core throttle state value, through application of combinations of specific voltages, frequencies, and throttle settings during each benchmark execution.

In some embodiments, the fine throttle index's "$0^{th}$" index entry results in no power savings, and the index's "$63^{rd}$" index entry results in a 66% power savings. These values were derived empirically as discussed elsewhere herein (see FIG. 5), and varying processing systems may have varying index values. The aforementioned fine throttle index is stored in a local SRAM device, embedded within, and accessible from, a Quad Management Engine (QME), which includes features to dynamically update the fine throttle index, where the term "quad" applies to the four-core chiplets as previously described. However, such management engines are not limited to quad core chiplets. The QME also includes a Decode Throttle Core (DTC) sequencer that is configured to receive and translate index requests directed toward one of the 64 index values, read the appropriate core index value out of the index in the QME SRAM, and then apply the respective core throttle state value to the fine throttle control that will throttle the core appropriately.

In one or more embodiments, as an overview, the embodiments described herein are configured to facilitate a microprocessor modeling its power consumption and predict when such power consumption will exceed the respective system's power delivery capacity, thereby potentially inducing an overcurrent condition. An on-chip model is constructed of charge consumption and replenishment for substantially the full spectrum of possible instruction processing and environmental conditions, such as, and without limitation, VRM performance. The overcurrent predict (OCP) system and associated logic as disclosed herein includes a plurality of distributed per core local charge tank counters to track local core activity. In some embodiments, such local charge tank counters are in the form of charge value accumulators. The OCP system and logic also includes a global charge tank counter. In some embodiments, the local and global charge tank counters are positioned directly on the respective chip and are used to model charge depletion and replenishment either locally or global, as designated.

In one or more embodiments, the global charge tank counter models the real-time current (power) delivery from the external VRM, and the respective charges are replenished at a programmable interval. For example, in some embodiments a small recharge value is subtracted from the global charge tank counter every cycle to represent the supply recharge current from the VRM to the global charge tank counter. Therefore, the global charge tank counter may be used to represent charge level deficits at the package/circuit board level due to overcurrent conditions. Each charge value accumulator requests a charge credit from the global charge tank counter and tracks core activity relative to the charge credit received. If the global charge tank counter shows a global charge deficit, it will delay granting local charge credit requests for the respective processor cores through programmable temporal delay periods. Therefore, such delays facilitate predicting further global charge deficits and the delays are one mechanism to mitigate exacerbating the global charge deficit. Delays are discussed further herein.

In at least some embodiments, the measurements of charge within the global charge tank counter include increasing the value when the charges therein are being granted to the local charge tank counters, i.e., the charge value accumulators, and decreasing the value of charge when the global charge tank is replenished. Therefore, for example, when the respective processor core is relatively idle, the charge counter will indicate zero and if the charge value accumulators for the respective processor cores are requesting a large amount of credit, the global charge tank counter increments at a relatively rapid rate and the value can become very large, as will be discussed further herein.

In at least some embodiments, each charge value accumulator tracks the respective processor core activity through a digital power proxy localized for each respective processor core. The digital power proxy is configured to approximate the actual core activity, translate the recorded core activity into an equivalent charge count value, where each respective processor core activity has a known equivalent charge value, and stores the resultant charge count value in the processor core activity accumulator, i.e., an activity-based charge value accumulator, herein the charge value accumulator.

In some embodiments, the core activity-to-charge count translation includes one or more scaling and/or weighting factors to enhance the equivalency of the charge count applied to the charge value accumulator to the recorded activities. Such equivalency enhancement is performed with respect to how quickly the charge is replenished on the chip in order to facilitate maintaining the desired level of charge on the respective processor core through the OCP control logic and application of the appropriate throttle settings to avoid charge depletion when necessary. When the respective processor core activity accumulator exceeds a programmable threshold for the recorded activity, the charge value accumulator logic transmits a programmable fixed-value request to the global charge counter for a charge credit refill. When the request is granted, the programmable fixed-number of charge credit is transmitted to the charge value accumulator, as an equivalent programmable fixed-number of charge credits is subtracted from the present local activity-based charge count in the respective local charge value accumulator.

In some embodiments, as the charge level for the respective processor core depletes through the aforementioned processing energy usage, the OCP logic includes, for each respective processor core, a threshold value with which the charge equivalent of the recorded processor core activity level is compared. When the activity level exceeds the established charge threshold, the charge value accumulator transmits a charge request to the global charge tank counter for charge credit. In response, the global charge tank counter is modeling the rate at which the charge value accumulator for the requesting processor core can be replenishing from the global charge tank counter for the entire chip. For those conditions where the global charge tank counter has sufficient charge capacity therein, a grant of the requested charge credit will be quickly granted, and an equivalent programmable value of the charge replenishment to the respective processor core is subtracted from the stored activity-based charge value in the charge value accumulator for the respective digital power proxy. Accordingly, for steady-state processing activity in the processor core, i.e., known processing activities that are within the processing core's configuration to process with no relatively large bursts of processing activity, the charge depletion of the charge value accumulator and charge replenishment thereof from the global charge tank counter is maintained sufficiently such that throttling of the processor core is not required, and the charge value in the charge value accumulator is maintained at a relatively low value.

Additionally, in some embodiments, the processor core's activity levels may experience bursts of processing activity based on a burst of instructions to process. Such processing activity bursts are known and the equivalent charge accumulation rates are also known such that the rate at which the respective charge value accumulator is filling can be ascertained. Therefore, in some embodiments, as the equivalent charge values for the processor activities are accumulating, the OCP logic includes sufficient capabilities to increase the core throttling commensurate with the present level of accumulated charge value. More specifically, there are established charge value values for the charge value accumulator that are related to throttling values, such that as the charge values decrease, the throttling of the processor cores increases. Accordingly, the charge depletion in the respective charge value accumulator may be anticipated, i.e., predicted, such that preemptive throttling action may be applied.

In at least some embodiments, the fine throttle index is proportional to the local credit deficit as measured by the charge value accumulator. Therefore, as the charge level in the charge value accumulator changes, the throttle state adjusts accordingly. For example, when the charge value accumulator has obtained sufficient credit, the throttle is removed.

The throttling values are pulled from the fine throttle index that was previously described. For those circumstances where more than one of the four processing cores are experiencing "bursty" processing activity, the QME (through the cores' respective core power management satellite (CPMS) modules) arbitrates the requests to refill the charge value accumulators per their respective charge value accumulator's charge credit requests. For those processing devices that include, e.g., and without limitation, 8 quad core chiplets, the OCP logic arbitrates between the 8 QMEs. For those circumstances where the OCP logic determines that the charge value accumulator's credits cannot be replenished fast enough through the global charge tank counter, and the depletion rate is such that the OCP control logic predicts a voltage droop is imminent, the OCP logic pro-actively engages the fine throttle index to more aggressively select the throttling states that are necessary for preventing the voltage droop conditions.

Moreover, in one or more embodiments, the CPMSs within the respective QMEs also control the aforementioned delays when the global charge tank counter shows a global charge deficit. The QME, through the respective CPMS for the affected processor core, will delay granting local charge credit requests for the respective processor core through programmable temporal delay periods. Such action facilitates allowing the global charge tank to recharge. When a request for charge credit from the charge value accumulator is received by the global charge tank counter, a delayed grant will cause the transmission of the request to a delay queue, and will start a delay counter for the respective processor core. That particular charge credit request will be held for at least one delay count before the grant is transmitted from the global charge tank counter. If the charge credit request comes in and the grant delay counter has already started, the charge credit request will be transmitted to a pending queue before going into the delay queue, and the charge credit request must wait until the delay counter resets to zero and the subsequent at least one delay count is complete. In some embodiments, the temporal length of the issued delay is at least partially proportional to the size of one or more of the pending the charge requests from all four processor cores. The delays directed toward refilling the charge value accumulators facilitates the use of more aggressive throttling due to the increasing charge deficits in the respective charge value accumulators.

In addition, in one or more embodiments, the OCP control logic is configured to target reduced core energy consumption at a fixed frequency based on the charge value accumulator deficits by dynamically adjusting the core throttle state. The throttle settings, i.e., the core throttle state values are generated and transmitted to the processor core by writing the requested fine throttle index value to a fine throttle index (FTX) register. In some embodiments, for a faster and more consistent response, the OCP control logic monitors the core and requests a new throttle index value as warranted. A DTC sequencer reads the core throttle state values from the fine throttle index in the QME SRAM and applies the respective throttle state settings to the core as a response to a fine throttle index request from the OCP control logic. Accordingly, abstracting the core throttle state settings to an index (i.e., the fine throttle index), and automatically applying the core throttle state settings in response to a sensed deficit in the charge value accumulator, simplifies and facilitates complex hardware and software control loops (if implemented) to manage the core power consumption.

Moreover, the OCP control logic is substantially hardware-based i.e., the OCP control logic is configured as physical circuitry that uses software to execute the features as described herein. In contrast, implementation as software control logic would require the control logic be managed through software control features resident within the QME, or, alternatively, one or more additional QMEs. In such software control logic implementations, at least one of the QMEs is configured to exercise such control of the OCP control logic and since the OCP logic operates in real-time, it requires dedicated resources from the associated QME. Therefore, in at least some of the embodiments described herein, the OCP control logic is implemented as hardware control logic to decrease the reliance on the limited QME resources. In addition, the software control loop implementation would often rely on a program sequence (instructions) running on a dedicated processor to sample inputs, combine terms, and adjust the outputs. The dedicated hardware control loop described herein executes operations, e.g., and without limitation, sampling and combining terms in parallel with the other processor-based operations, and reacting more quickly in a cycle-by-cycle timeframe, thereby enhancing the speed of operation over that of a software control loop. Moreover, for example, in such hardware-based embodiments, the DTC sequencer facilitates adjustment of the core throttle state settings in the respective FTX register without software intervention.

In one or more embodiments, this fine-grained core throttle management is supplemented by protective hardware features, including, without limitation, a digital droop sensor to measure core voltage droop and the associated hardware to quickly react with course core throttling to prevent any decrease in the service life of the integrated circuit. The coarse throttling is implemented in hardware to minimize the reaction time and arrest the voltage droop. When engaged, the coarse throttling has a significant impact on core performance. Accordingly, the fine-grained power management through the OCP loop is configured to prevent exercising of the coarse throttle control.

Referring to FIG. 1, a block schematic diagram is provided illustrating a computer system (herein referred to as "the system 100"), in accordance with some embodiments of the present disclosure. The system 100 includes one or more processing devices 104 (only one shown) communicatively and operably coupled to one or more memory devices 106 (only one shown) through a communication bus 102, and in some embodiments, through a memory bus (not shown). The processing device 104 is a multicore processing device (discussed further herein with respect to FIGS. 1, 2, and 3). The system 100 also includes a data storage system 108 that is communicatively and operably coupled to the processing device 104 and memory device 106 through the communications bus 102. The system 100 further includes one or more input devices 110 and one or more output devices 112 communicatively and operably coupled to the communications bus 102. In addition, the system 100 includes one or more Internet connections 114 (only one shown) and one or more network connections 118 (only one shown). The Internet connections 114 and the network connections 118 facilitate communicatively coupling the processing device 104 and the memory device 106 to the cloud 116 and one or more other computing devices 120, respectively, through the communications bus 102. In some embodiments, the Internet connections 114 facilitate communication between the system 100 and one or more cloud-based centralized systems and/or services (not shown in FIG. 1).

The processing device 104 includes a first microprocessor 130-1, a second microprocessor 130-2, etc., up through an $N^{th}$ microprocessor 130-N, where N is any integer that enables operation of the system 100 as described herein. Each of the microprocessors 130-1 through 130-N are multicore processors as described further with respect to FIG. 2. In many embodiments, the majority of the energy management features described further herein are present in the individual microprocessors 130-1 through 130-N.

In at least some embodiments, the data storage system 108 provides storage to, and without limitation, a knowledge base 190 that includes data that may be employed by the microprocessors 130-1 through 130-N, e.g., and without limitation, the SPECint benchmarks 192.

Figure 2:
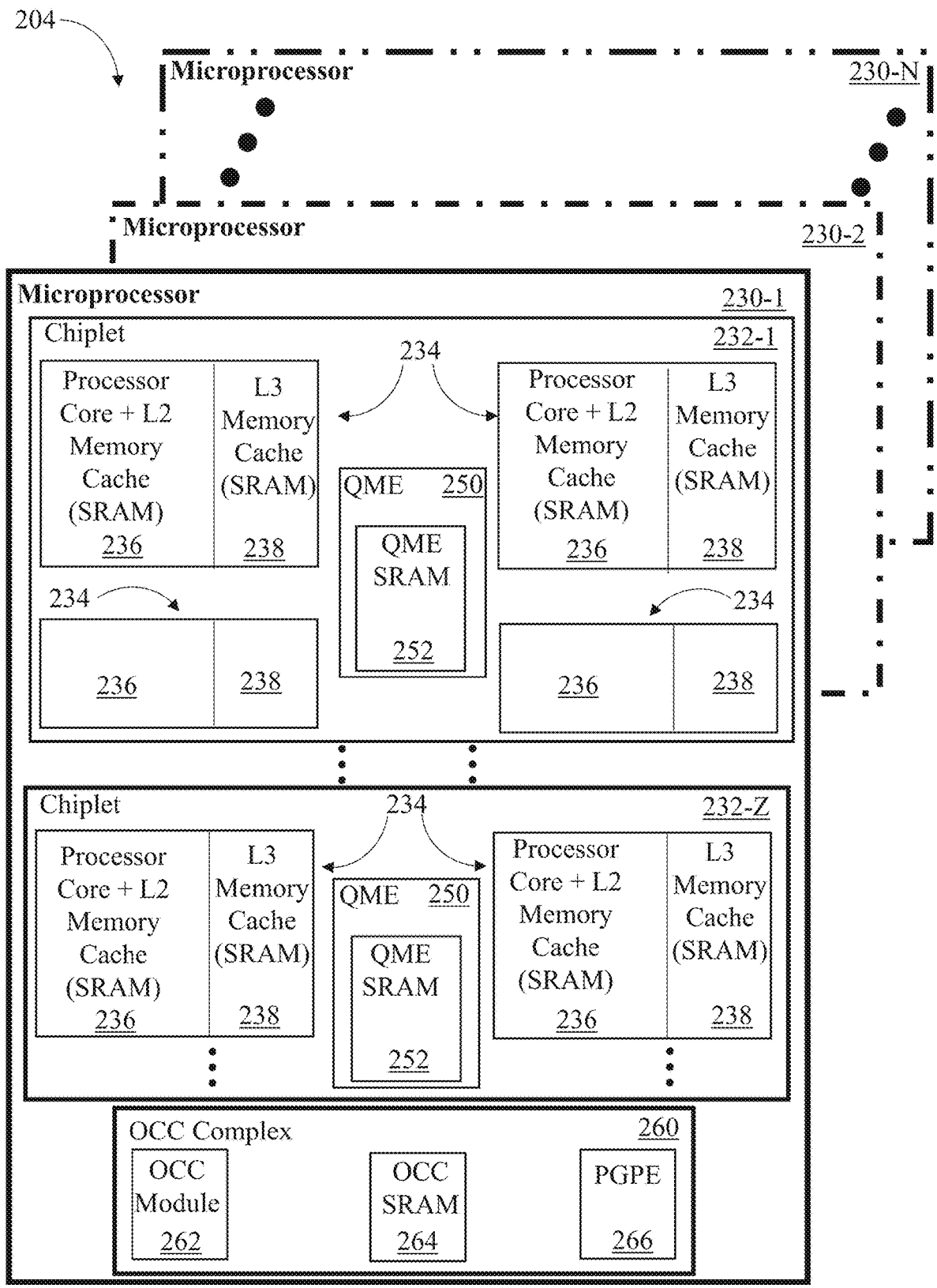
FIG. 2 is a block schematic diagram illustrating the microprocessors shown in FIG. 1 with additional detail, in accordance with some embodiments of the present disclosure.

Referring to FIG. 2, a block schematic diagram is presented illustrating the microprocessors 230-1, 230-2, etc. through 230-N, of a processing device 204, in accordance with some embodiments of the present disclosure. The processing device 204 is substantially similar to the processing device 104 (shown in FIG. 1). Accordingly, the microprocessors 230-1 through 230-N are substantially similar to the microprocessors 130-1 through 130-N, respectively (shown in FIG. 1). In some embodiments, the microprocessors 230-1 through 230-N are substantially similar to each other. In some embodiments, one or more of the microprocessors 230-1 through 230-N are dissimilar to one or more of the other microprocessors 230-1 through 230-N. The outlines of the microprocessors 230-1 through 230-N as drawn are substantially similar to the respective microprocessors 130-1 through 130-N as drawn in FIG. 1 to facilitate the discussions herein.

The quad chiplet 232-1 includes four processor devices 234, where each processor device 234 includes a processor core plus an L2 memory cache portion 236 (herein referred to as "the core/L2 portion 236") and an L3 memory cache portion 238 (herein referred to as "the L3 portion") that is communicatively and operably coupled to the core/L2 portion 236. Each core/L2 portion 236 includes approximately 2 megabytes (MB) of L2 SRAM and each L3 portion 238 includes approximately 4 MB of L3 SRAM, where the 2 MB and 4 MB values are non-limiting. The quad chiplet 232-1 also includes a Quad Management Engine (QME) 250 that is an autonomous subsystem that is communicatively and operably coupled to all four processor devices 234. In some embodiments, the QME 250 is a dedicated microcontroller. The QME 250 is configured to facilitate management of the processor devices 234, including, without limitation, powering the processor devices 234 between "off" (or "stop") and "on" states and the core power draw.

In at least some embodiments, the QME 250 includes 64 kilobytes (KB) of QME SRAM 252, where the value 64 is non-limiting. Among other features described further herein, the QME SRAM 252 houses a throttle index table, i.e., the fine throttle index (FTX), also described further herein. In addition, the QME SRAM 252 includes features configured to activate core throttling circuits (discussed further herein). Moreover, the QME 250 includes features configured to dynamically update the fine throttle index as discussed further herein. The remaining quad chiplets up to and including the quad chiplet 232-Z are substantially similar to the quad chiplet 232-1.

In at least some embodiments, the microprocessor 230-1 includes an on-chip controller (OCC) complex 260 that facilitates management of one or more functions of the microprocessor 230-1. The OCC complex 260 includes an OCC module 262 that is a combination of hardware and firmware that is configured to, without limitation, support the system power management, maintain the temperature of the microprocessor 230-1 within established rating parameters, and execute fault tolerance and performance boost features. The OCC complex 260 also includes approximately 1 MB of OCC SRAM 264 communicatively and operably coupled to the OCC module 262 to support operation of the OCC module 262. In addition, the OCC complex 260 includes a PState general purpose engine (PGPE) 266 that is configured to globally manage the power consumption of the microprocessor 230-1 across all of the quad chiplets 232-1 through 232-Z based on the power state (PState) of the microprocessor 230-1. The PState includes a set of values such as the present voltage and the present frequency. The PGPE 266 is discussed further herein with respect to its role in power consumption management for the individual processor cores in the respective the core/L2 portions 236.

Figure 3:
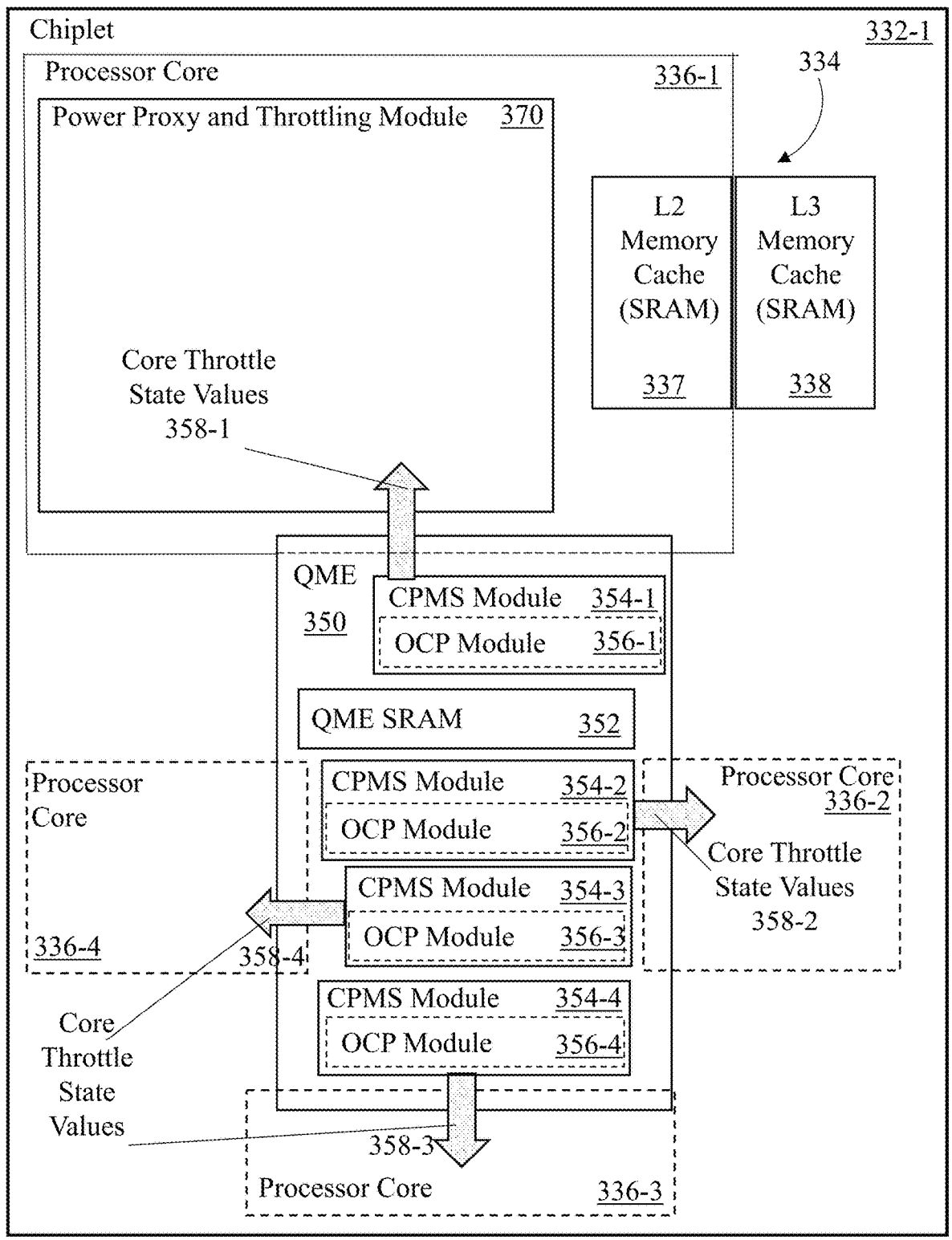
FIG. 3 is a block schematic diagram illustrating a quad chiplet, in accordance with some embodiments of the present disclosure.

Referring to FIG. 3, a block schematic diagram is presented illustrating a quad chiplet 332-1, in accordance with some embodiments of the present disclosure. The quad chiplet 332-1 is substantially similar to the quad chiplet 232-1 (shown in FIG. 2) and includes a first processor core 334 that includes a first processor 336-1, L2 memory cache 337, and L3 memory cache 338. The quad chiplet 332-1 also includes a second processor core 336-2, a third processor core 336-1, and a fourth processor core 336-4. A QME 350 (that is substantially similar to the QME 250 shown in FIG. 2) includes a QME SRAM 352 (that is substantially similar to the QME SRAM 252 shown in FIG. 2). The QME 350 also includes a first core power management satellite (CPMS) module 354-1. In some embodiments, the CPMS module 354-1 is referred to as a "QME satellite," and in some embodiments, as a "power management satellite." In the embodiments described further herein, the CPMS module 354-1 interfaces with a power proxy and throttling module 370 (discussed further in reference to FIG. 4). The CPMS module 354-1 includes an overcurrent predict (OCP) module 356-1 that includes an adaptive OCP control loop. The OCP control loop is configured to analyze the activity level of the processor core 336-1 through the level of charges in the respective charge value accumulator for the respective processor core and dynamically determine fine control throttle state setpoints, i.e., core throttle state values 358-1, or adjustments, thereto as discussed further herein.

The QME 350 also includes a second CPMS module 354-2 that includes a second OCP module 356-2 configured to dynamically determine core throttle state values 358-2. The QME 350 further includes a third CPMS module 354-3 that includes a third OCP module 356-3 configured to dynamically determine core throttle state values 358-3. In addition, the QME 350 includes a fourth CPMS module 354-4 that includes a fourth OCP module 356-3 configured to dynamically determine core throttle state values 358-4. In some embodiments, the four CPMS modules 354-1 through 354-4 and their respective OCP modules 356-1 through 356-4 are substantially identical. In some embodiments, the four CPMS modules 354-1 through 354-4 and their respective OCP modules 356-1 through 356-4 are individualized for distinguishing features associated with their respective processor cores 336-1 through 336-4.

Figure 4:
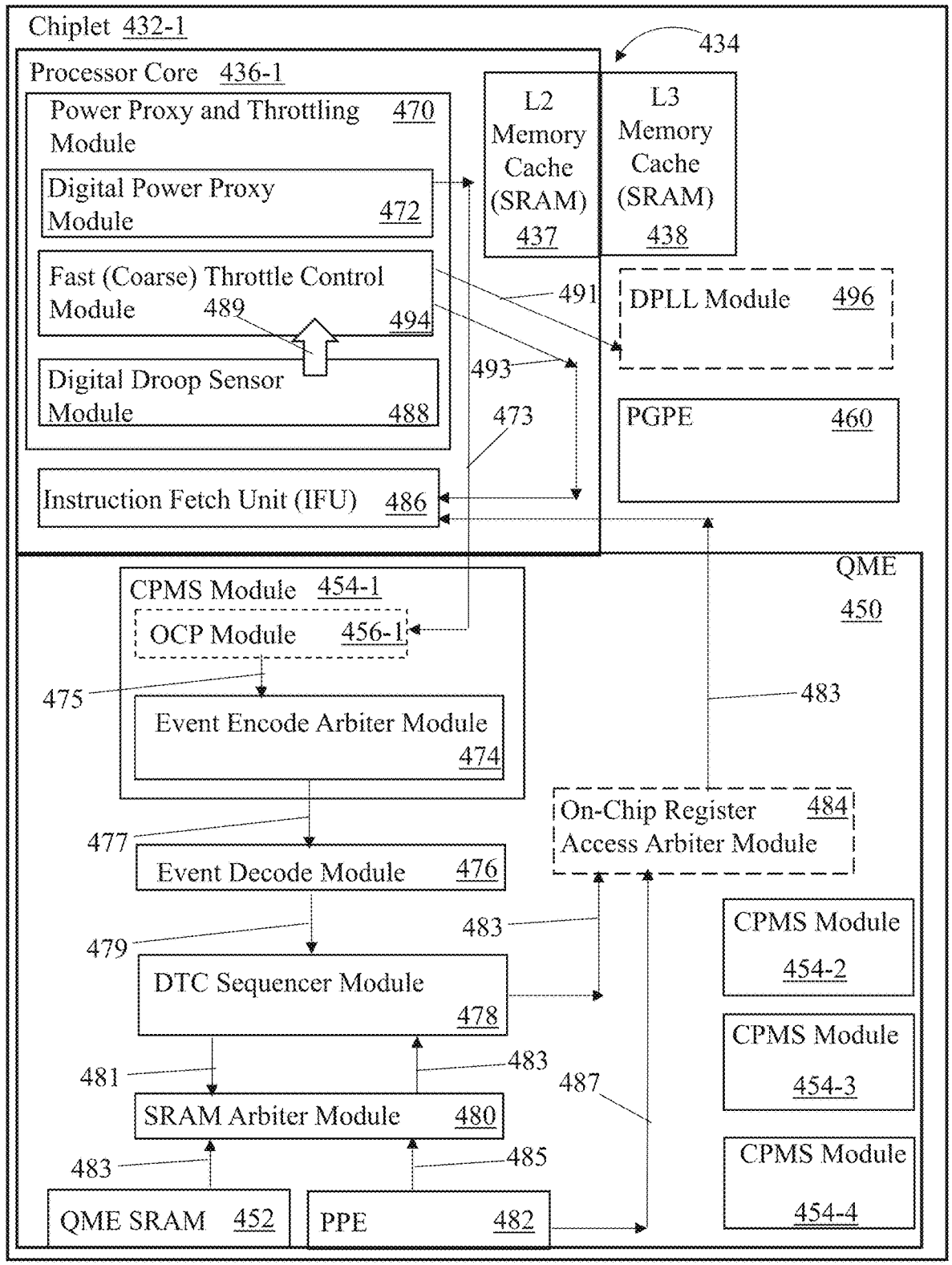
FIG. 4 is a block schematic diagram further illustrating the quad chiplet shown in FIG. 3, in accordance with some embodiments of the present disclosure.

Referring to FIG. 4, a block schematic diagram is presented further illustrating the quad chiplet 332-1 shown in FIG. 3, in accordance with some embodiments of the present disclosure. The chiplet 432-1, processor core 436-1, L2 memory cache 437, L3, memory cache 438, QME 450, QME SRAM 452, CPMS modules 454-1 through 454-4, OCP module 456-1, and power proxy and throttling module 470 are substantially similar to the similarly numbered items in FIG. 3. The PGPE 466 is substantially similar to the PGPE 266 (shown in FIG. 2). The power proxy and throttling module 470 includes one or more digital power proxy modules 472 (only one shown) that are configured to approximate the power the processor core 436-1 consumes in real-time. The digital power proxy module 472 is communicatively and operably coupled to the OCP module 456-1 within the CPMS module 454-1. In general, the digital power proxy module 472 uses a weighted computation of certain core performance counters to produce an approximation of the power used by the processor core 436-1 over a predefined interval (discussed further below).

The digital power proxy module 472 monitors a set of counters (not shown) that are associated with energy/power management, e.g., and without limitation, Energy Management Power And THermal (EMPATH) counters that are specifically, and exclusively, configured to count previously specified events that are associated with power management of the respective processor core 436. Whenever an activity, i.e., event specified to be monitored occurs, the digital power proxy module 472 adds a value equal to a power usage weight or scaling associated with the event to the counter. The weighting and scaling factors used to determine the power usage values of the events are determined through one or more of empirical data and processor core models. For example, and without limitation, the core activity-to-charge count translation using the one or more scaling and/or weighting factors includes factoring in how quickly the charge is replenished on the chip in order to facilitate maintaining the desired level of charge on the respective processor core through the OCP control logic and application of the appropriate throttle settings to avoid charge depletion when necessary.

Each of the power consumption events for the processor core 436-1 include a value representative of the power consumption for each respective event, and the occurrence of each event over a predetermined period of time is counted to facilitate the generation of an accumulated value for the total estimated power consumption by the processor core 436-1 over the respective interval or period. Accordingly, the digital power proxy module 472 generates and transmits a charge count value 473 to the OCP module 456-1 that is substantially representative of the power draw by the processor core 436-1.

In at least some embodiments, each charge value accumulator tracks the respective processor core activity through the digital power proxy module 472 localized for each respective processor core. The digital power proxy module 472 is configured to approximate the actual core activity, translate the recorded core activity into the equivalent charge count value 473, where each respective processor core activity has a known equivalent charge value, and stores the resultant charge count value in a processor core activity accumulator, i.e., an activity-based charge value accumulator, herein the charge value accumulator (not shown in FIG. 4, but discussed further with respect to FIG. 6).

In at least some embodiments, the chiplet 432-1 includes embedded dynamic power throttle logic to manage core performance through limiting the instruction fetch rate by the processor core 436-1 from the nearby L2 memory cache 437, and/or limiting the number of in-flight instructions already present within the processor core 436-1. As previously described, the digital power proxy module 472 is communicatively and operably coupled to the OCP module 456-1 within the CPMS module 454-1, where the digital power proxy module 472 is configured to generate and transmit the accumulated APP power value 473 of the power consumption by the processor core 436-1 during a predetermined interval or period of time.

The CPMS module 454-1 also includes an event encode arbiter module 474 that is communicatively and operably coupled to the OCP module 456-1. The OCP module 456-1 is configured to generate and transmit a FTX request event signal 475, where "FTX" represents "fine throttle index" and the signal 475 is representative of an event in the processor core 436-1 that will require more or less throttling than is presently in place. The event encode arbiter module 474 is configured to receive the FTX request event signal 475 and selects those events that will be further processed and encodes those events for transmission as encoded FTX event signals 477 to an event decode module 476 that is configured to receive and decode the FTX event signals 477 to generate decoded FTX event signals 479 and transmit them to a decode throttle core (DTC) sequencer module 478. The DTC sequencer module 478 is configured to receive FTX event signals 479 from all four CPMS modules 454-1 through 454-4, and, therefore, the DTC sequencer module 478 is configured to sequence the order upon which the FTX event signals 479 will be acted upon. In addition, the DTC sequencer module 478 is configured to generate a QME SRAM access request signal 479 that is transmitted to a SRAM arbiter module 480. The SRAM arbiter module 480 is configured to receive the QME SRAM access request signal 479 and grant access to the QME SRAM 452 to read the proper core throttle state index values (both fetch and in-flight) from the fine throttle index including the core throttle state index values resident within the QME SRAM 452. The proper core throttle setting value is transmitted to the DTC update sequencer module 478 as an instruction fetch rate throttle setting signal 483.

In at least some embodiments, there are a number of embedded microcontrollers referred to as power processing elements (PPEs) within the QME 450. As shown in FIG. 4, a PPE 482 is communicatively and operably coupled to the SRAM arbiter module 480 to issue control commands 485 to the SRAM arbiter module 480. The QME 450 further includes an on-line register access arbiter module 484 communicatively and operably coupled to the DTC sequencer module 478. In at least some embodiments, the on-line register access arbiter module 484 is a global application for the entire microprocessor 230-1, and is therefore shown in phantom. The chiplet 432-1 includes a plurality of registers thereon and therefore includes the necessary software for reading from and writing to the registers though an on-chip networking application, including, and without limitation, a serial communication infrastructure implemented to facilitate reading to and writing from the plurality of registers within the microprocessor 230-1. The on-chip register access arbiter module 484 is communicatively and operably coupled to the PPE 482 to receive control commands 487 from the PPE 482. The on-chip register access arbiter module 480 is further configured to transmit the instruction fetch rate throttle setting signal 483 to the DTC update sequencer module 478, that, in turn, is configured to transmit the instruction fetch rate throttle setting signal 483 to the on-chip register access arbiter module 484.

In some embodiments, the processor core 436-1 includes an instruction fetch unit (IFU) 486 that is configured to modulate the throttling of the fetch rate of the instructions into the processor core 436-1 and throttling of the in-flight instructions, in that order of priority. Specifically, the fetch rate throttling is used to produce the initial throttle entries to prevent the core pipeline from filling up. As the rate throttling approaches its maximum effectiveness, in-flight throttling is incorporated to produce a further reduction in power.

In some embodiments, the IFU 486 is a portion of a larger throttle activation system that is beyond the scope of this disclosure. The on-chip register access arbiter module 484 is configured to transmit the instruction fetch rate and in-flight instructions throttle settings signal 483 to the IFU 486 in the processor core 436-1. The IFU 486 facilitates managing the instruction fetch rate and the in-flight instructions that optimally balance power consumption up to predetermined limits to most effectively use the processing capabilities of the processor core 436-1 while avoiding downward voltage transients that may induce voltage droop conditions and subsequently, more robust throttle actions. The IFU 486 is further configured to apply the fine throttle rate and in-flight settings to the decode stage of the processing core's instruction cycle, restricting the rate of decoding and dispatch of the instructions, and thereby reducing the demand for instructions from the IFU 486, where the fetch action by the IFU 486 will not exceed the present restrictions on decoding and dispatching the instructions.

In one or more embodiments, the processor core 436-1 includes a digital droop sensor module 488 that is configured to determine impending voltage droop conditions on the processor core 436-1 and generate and transmit a voltage droop signal 489. The processor core 436-1 further includes a fast (coarse) throttle control module 494 that is communicatively and operably coupled to the digital droop sensor module 488. The microprocessor 230-1 (shown in FIG. 2) also includes a digital phase-locked loop (DPLL) module 496 that is shown in phantom in FIG. 4 to represent that the chiplet 432-1 itself does not include the DPLL module 496; however, the DPLL 496 is configured to implement the actions as described herein with respect to a portion of the components in FIG. 4. Specifically, the DPLL module 496 is configured for chip-level frequency control for all of the processor cores on the respective microchip 230-1, including each of the four processor cores 436-1 through 436-4 (only processor core 436-1 shown on FIG. 4). The coarse throttle control module 494 is communicatively and operably coupled to the DPLL module 496 and the IFU 486. Accordingly, the course throttle control module 494 is further configured to transmit frequency control commands 491 and instruction fetch control commands 493 to the DPLL module 496 and the IFU 486, respectively, to decrease the instruction processing load on the processor core 436-1 rapidly through the two throttling mechanisms. In some embodiments, the instruction fetch rate is typically the first variable that is modulated, since it does not involve modulating the core clocking. In contrast, the DPLL module 496 reacts to the digital droop sensor module 488 and is configured to quickly reduce the core frequency, and is therefore, in at least some embodiments, a secondary control mechanism that is employed to reduce the severity of the impending voltage droop conditions.

Figure 5:
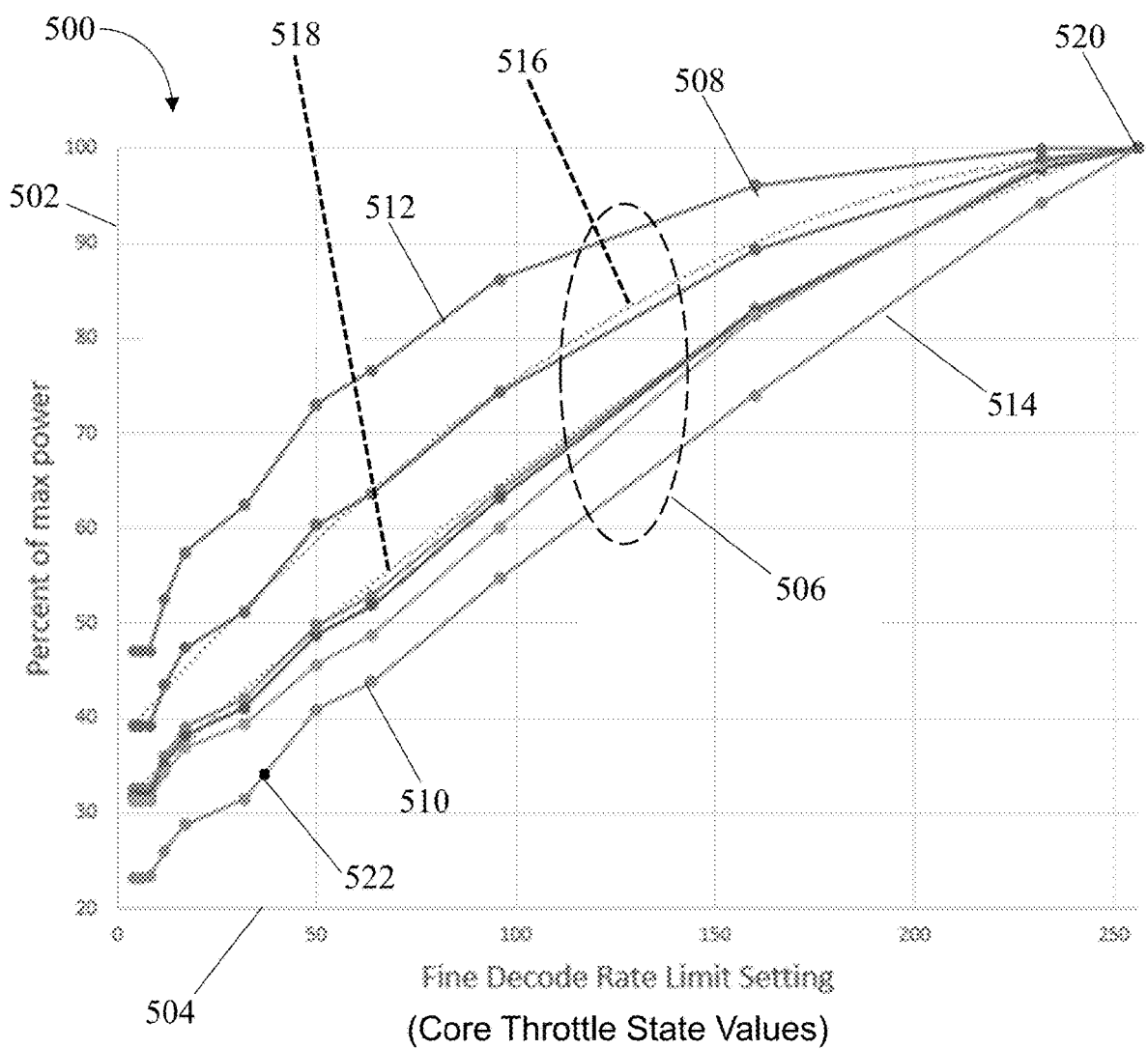
FIG. 5 is a graphical diagram illustrating a percent of maximum power as a function of a fine decode rate limit setting, in accordance with some embodiments of the present disclosure.

Referring to FIG. 5, a graphical diagram 500 is presented illustrating a percent of maximum power as a function of a fine decode rate limit setting, in accordance with some embodiments of the present disclosure. As described with respect to FIG. 4, the rate limit settings are directed toward the decode and dispatch portion of the instruction cycle. The graphical diagram 500 includes a y-axis 502 that is representative of the percent maximum power of a processor core extending from 20% through 100%. The graphical diagram 500 also includes an x-axis 504 that is representative of the fine decode rate limit setting (core throttle state value) for 256 increments, i.e., extending from 0 instructions per unit time (IPUT) to 255 IPUT.

The graphical diagram 500 further includes a plurality of curves 506 representing the relationships between the power consumption of the processor core and the core throttle state values of the instruction fetch rate for a variety of core conditions and analyses. The power consumption for the spectrum of operations executed by the core is well measured and the performance of the core through processing the instructions is well known. Therefore, initially, for a known workload, a baseline data set was recorded with no throttling applied for a number of SPECint benchmarks, i.e., the fine decode rate limit setting was set to 255 IPUT. Subsequent runs of the various SPECint benchmarks with varying degrees of rate and in-flight throttling and the respective power consumption values for the core were recorded. The power reduction in the core was measured for the respective SPECint benchmarks, thereby developing a volume of empirical data. Two examples of the recorded data for the respective SPECint benchmarks are identified as 508 and 510 in FIG. 5, where the values associated with the benchmark 508 is approximately 95% of maximum core power for a fine decode rate limit setting of approximately 160 IPUT, i.e., a throttling of approximately 59 IPUT. Similarly, for the benchmark 510, the values are approximately 44% of maximum core power for a fine decode rate limit setting of approximately 65 IPUT, i.e., a throttling of approximately 190 IPUT. Accordingly, as the throttling of the fetch rate of the instructions and the in-flight instructions increases, the respective value of the fine decode rate limit setting decreases with a respective decrease in power consumption by the processor core.

A variety of mathematical techniques were used to derive the respective curves 506 from the benchmark data points. For example, as shown in FIG. 5, a first curve 512 and a second curve 514 define the upper and lower bounds, respectively, of the power reductions to be expected with the respective core throttling. Notably, the subsequent post-testing analyses facilitated deriving the second curve 514. For example, a first fit curve 516 and a second fit curve 518 are derived through the use of a commercially-available curve fit function. The algorithm for the first fit curve 516 is: $Y=-0.0005*X^2+0.4005*X+30.614$; and the algorithm for the second fit curve is: $Y=-0.0009*X^2+0.4725*X+37.393$. These algorithms may be combined with each other, and with other algorithms derived similarly, to generate the second curve 514. A significant portion of the curve 514 between approximately 50 IPUT and 255 IPUT is substantially linear, thereby establishing a substantially linear relationship between core power and core throttling to facilitate predictable responses by the processor core to throttling actions. The near-linearity of the second curve 514 is at least partially due to establishment of the parameters necessary for such linearity. In addition to the curve 514, the aforementioned statistical analyses facilitated production of the combined 64-entry fine throttle index (FTX) that is resident within the QME SRAM 452, i.e., the index of instruction fetch rate throttle settings and in-flight instruction throttle settings that map a respective power reduction to the throttle index.

As the core throttle state value 504 is decreased, i.e., as the value decreases from 255 IPUT toward 0 IPUT, the amount of core throttling is increased to decrease the resultant power consumption as shown on the Y-axis 502. Similarly, as the core throttle state value 504 increases from 0 IPUT toward 255 IPUT, the amount of core throttling is decreased and the resultant power consumption is increased. The relationship between the second curve 514 and the throttle index values in the 64-entry fine throttle index (FTX) is substantially linear. As previously described, the fine throttle index's "$0^{th}$" index entry results in no power savings, and this is equivalent to the 255 IPUT value on the X-axis 504, i.e., point 520 on the second curve 514. Similarly, the index's "$63^{rd}$" index entry results in a 66% power savings, which is equivalent to the point 522 on the second curve 514. These values were derived empirically as discussed, and varying processing systems may have varying index values and core throttle state values. Therefore, a request for increased throttling is substantially equivalent to a request to decrease the respective core throttle state value, and the requested value from the fine throttle index is increased from the present index value between the $0^{th}$ to $63^{rd}$ index value to a greater index value.

Figure 6:
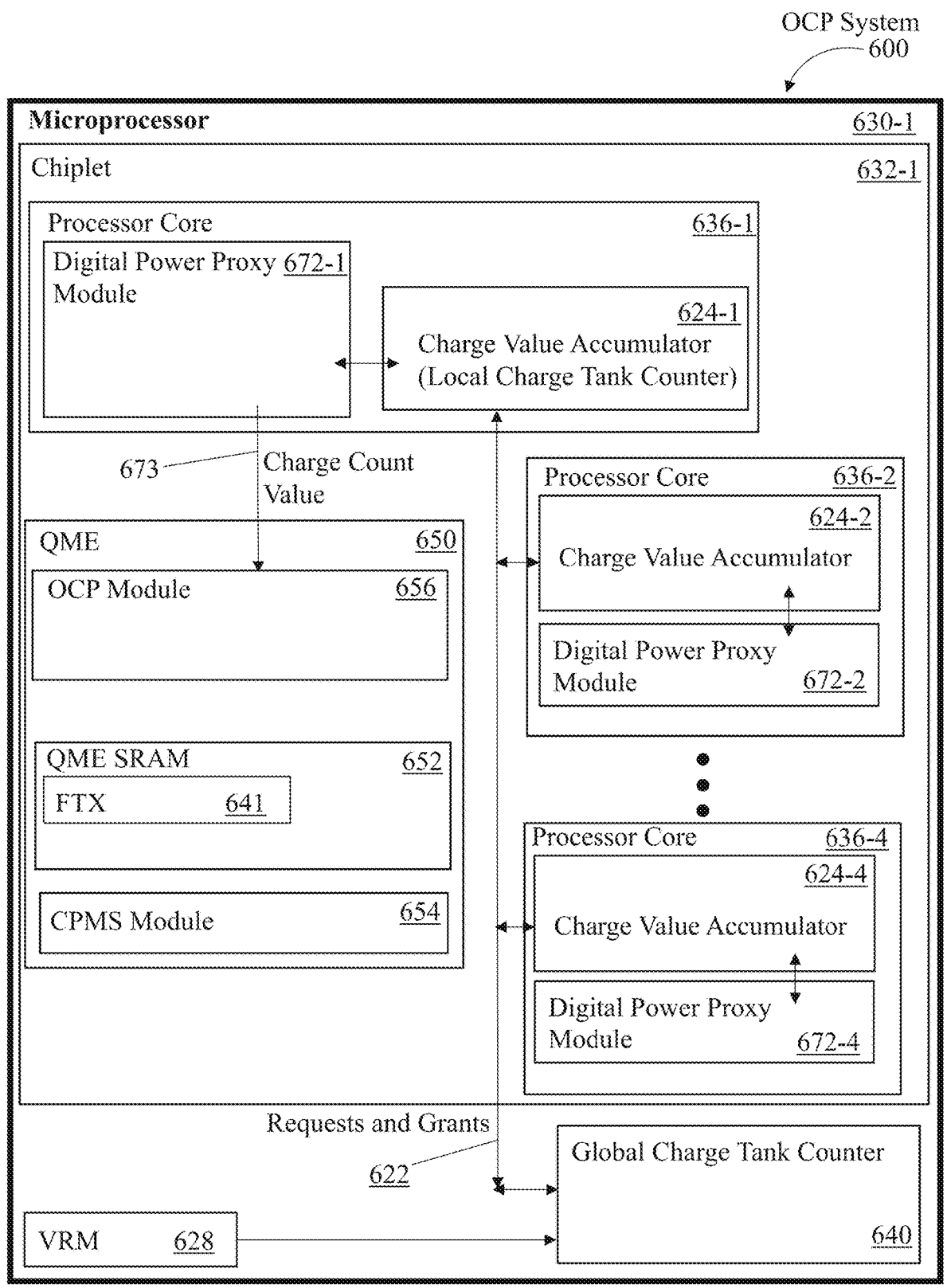
FIG. 6 is a block schematic diagram illustrating an overcurrent prediction (OCP) system architecture, in accordance with some embodiments of the present disclosure.

FIG. 6 is a block schematic diagram illustrating an architecture for an overcurrent predict (OCP) system 600, in accordance with some embodiments of the present disclosure. The microprocessor 630-1 is substantially similar to the similarly numbered component shown in FIG. 2. The chiplet 632-1, processor core 636-1, QME 650, QME SRAM 652, CPMS module 654-1, OCP module 656-1, and digital power proxy module 672 are substantially similar to the similarly numbered components shown in FIG. 4. In at least some embodiments, the overcurrent predict (OCP) system 600 includes a plurality of distributed per core local charge tank counters, i.e., charge value accumulators 624-1 through 624-4, respectively, to track local core activity. The OCP system 600 also includes a global charge tank counter 640. The charge value accumulators 624-1 through 624-4 are shown on their respective processor cores 636-1 through 636-4. When discussed in the aggregate, the processor cores 636-1 through 636-4 are referred as the processor cores 636, the digital power proxy modules 672-1 through 762-4 are referred to as the digital power proxy modules 672, and charge value accumulators 624-1 through 624-4 are referred to as the charge value accumulators 624.

In some embodiments, the charge value accumulators 624 are positioned directly on the chip, i.e., the microprocessor 630-1. In some embodiments, the global charge tank counter 640 are positioned directly on the respective chip, i.e., the microprocessor 632-1. The charge value accumulators 624 and the global charge tank counter 640 are used to model charge depletion and charge replenishment either locally or global, as designated.

Referring to the processor core 636-1, the digital power proxy module 672-1 is configured to approximate the energy the respective processor core 636-1 consumes in real-time through a weighted computation of core performance counters to produce an approximation of the power consumed as described with respect to FIG. 4. The digital power proxy module 672-1 is further configured to translate the recorded core activity into an equivalent charge count value, where each respective processor core activity has a known equivalent charge value, and stores the resultant charge count value in a processor core activity accumulator, i.e., an activity-based charge value accumulator, herein the charge value accumulator 624-1. In at least some embodiments, each charge value accumulators 624 tracks the respective processor core activity through the respective digital power proxy module 672 localized for each respective processor core 636. Accordingly, the digital power proxy module 672 generates charge values that are collected in the respective charge value accumulator 624 and transmits a charge count value 673 to the respective OCP module 656 that is substantially representative of the power draw by the respective processor core 636. The charge value accumulators 624 and the global charge tank counter 640 are communicatively and operably coupled to transmit and receive charge requests and charge grants 622 as described further herein.

In one or more embodiments, the global charge tank 640 is communicatively and operably coupled to one or more VRMs 628 (only one shown) for charge replenishment. In addition, the FTX 641 discussed with respect to FIG. 5 is shown resident within the QME SRAM 652, and is discussed further with respect to FIG. 8.

Figure 7:
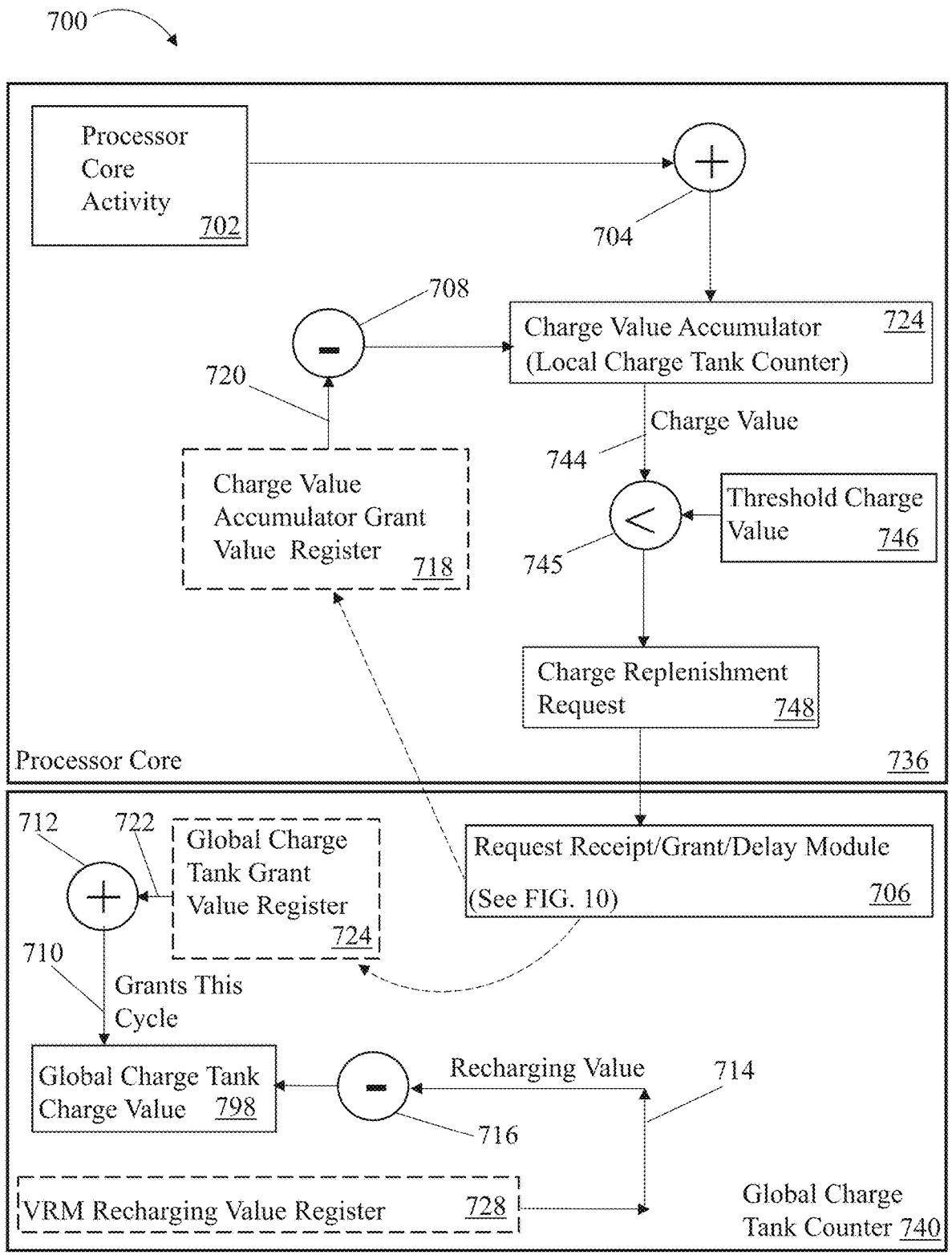
FIG. 7 is a block schematic diagram illustrating an OCP control logic architecture, in accordance with some embodiments of the present disclosure.

Referring to FIG. 7, a block schematic diagram is presented illustrating an OCP control logic 700 architecture, in accordance with some embodiments of the present disclosure. Processor core activity 702 is used to generate equivalent charge values as previously described. The processor core activity 702 is transmitted through an addition operator 704, where the charge value of the charge value accumulator 724 increases with increased processor core activity 702. In some embodiments, the charge level for the respective processor core 736 depletes through the aforementioned processing energy usage, and the charge value of the respective charge value accumulator 724 (local charge tank counter) increases. The charge value 744 present in the charge value accumulator 724 is compared to a threshold charge value 746 through a comparator (less than) operator 745. When the core activity level as represented by the charge value 744 exceeds the established charge threshold value 746, the charge value accumulator 724 transmits a valueless charge refill, i.e., charge replenishment request 748 to the global charge tank counter 740 for charge credit. Specifically, charge requests 748 are received and granted through a request receipt/grant/delay module 706 resident within the global charge tank counter 740. The request receipt/grant/delay module 706 is configured to process multiple charge replenishment requests 748 from all of the processor cores 736 on the chip. The request receipt/grant/delay module 706 is discussed further with respect to FIG. 10.

The global charge tank counter 740 is modeling the rate at which each charge value accumulator 724 for each requesting processor core 736 can be replenishing through the request receipt/grant/delay module 706 for the entire chip. For those conditions where the global charge tank counter 740 has sufficient charge capacity therein, a grant of the requested charge replenishment request (credit) 748 will be quickly generated. Upon generation of the grant, an equivalent programmable (and, in some embodiments, adjustable) value 720 associated with the charge replenishment is transmitted from a charge value accumulator grant value register 718 to a subtraction operator 708 from the stored activity-based charge value 744 in the charge value accumulator 724. For steady-state processing activity in the processor core 736, i.e., known processing activities that are within the processing core's configuration to process with no relatively large bursts of processing activity, the charge depletion of the charge value accumulator 724 is relatively constant. Charge replenishment thereof from the request receipt/grant/delay module 706 is maintained sufficiently such that throttling of the processor core 736 is not required, and the charge value 744 in the charge value accumulator 724 is maintained at a relatively low value. Accordingly, the OCP control logic 700 models the actual charge transfer mechanisms, including, without limitation, the physical characteristics of how charge transfer intrinsically occurs. The details of the actual charge transfer are beyond the scope of this disclosure. Accordingly, the charge value 744 of the charge value accumulator 724 increase with processor core activity 702 and decrease with charge replenishment grants.

In at least some embodiments, the measurements of charge within the global charge tank counter 740, i.e., the global charge tank charge value 798, include increasing the global charge tank charge value 798 with an equivalent programmable (and, in some embodiments, adjustable) value 722 resident within a global charge tank grant value register 724. When the charge replenishment requests 748 are being granted, the value 722 is transmitted to the global charge tank charge value 798 through an addition operator 712. Moreover, the global charge tank charge value 798 is decreased by the recharging value 714 through a subtraction operator 716 when the global charge tank counter 740 is replenished through the VRM 628. The recharging value 714 is an equivalent programmable (and, in some embodiments, adjustable) value 714 resident within a VRM recharging value register 728. Therefore, for example, when the respective processor core 736 is relatively idle, the global charge tank counter 740 will indicate zero and if the charge value accumulator 724 for the respective processor core 736 is requesting a large amount of credit, the global tank charge counter 740 (through the request receipt/grant/delay module 706) increments at a relatively rapid rate and the value can become very large, as will be discussed further herein.

In one or more embodiments, the global charge tank counter 740 models the real-time current (power) delivery from the external VRM 628, and the respective charges are replenished at a programmable interval. For example, in some embodiments a small recharge value is subtracted from the global charge tank counter 740 every cycle to represent the supply recharge current 714 from the VRM 728 to the global charge tank counter 740. Therefore, the global charge tank counter 740 may be used to represent charge level deficits at the package/circuit board level due to overcurrent conditions. Each charge value accumulator 724 requests a charge credit from the global charge tank counter 740 and tracks core activity relative to the charge credit received. If the global charge tank counter 740 shows a global charge deficit, it will delay granting local charge credit requests for the respective processor cores through programmable temporal delay periods. Delays are discussed further below with respect to FIG. 10.

Figure 8:
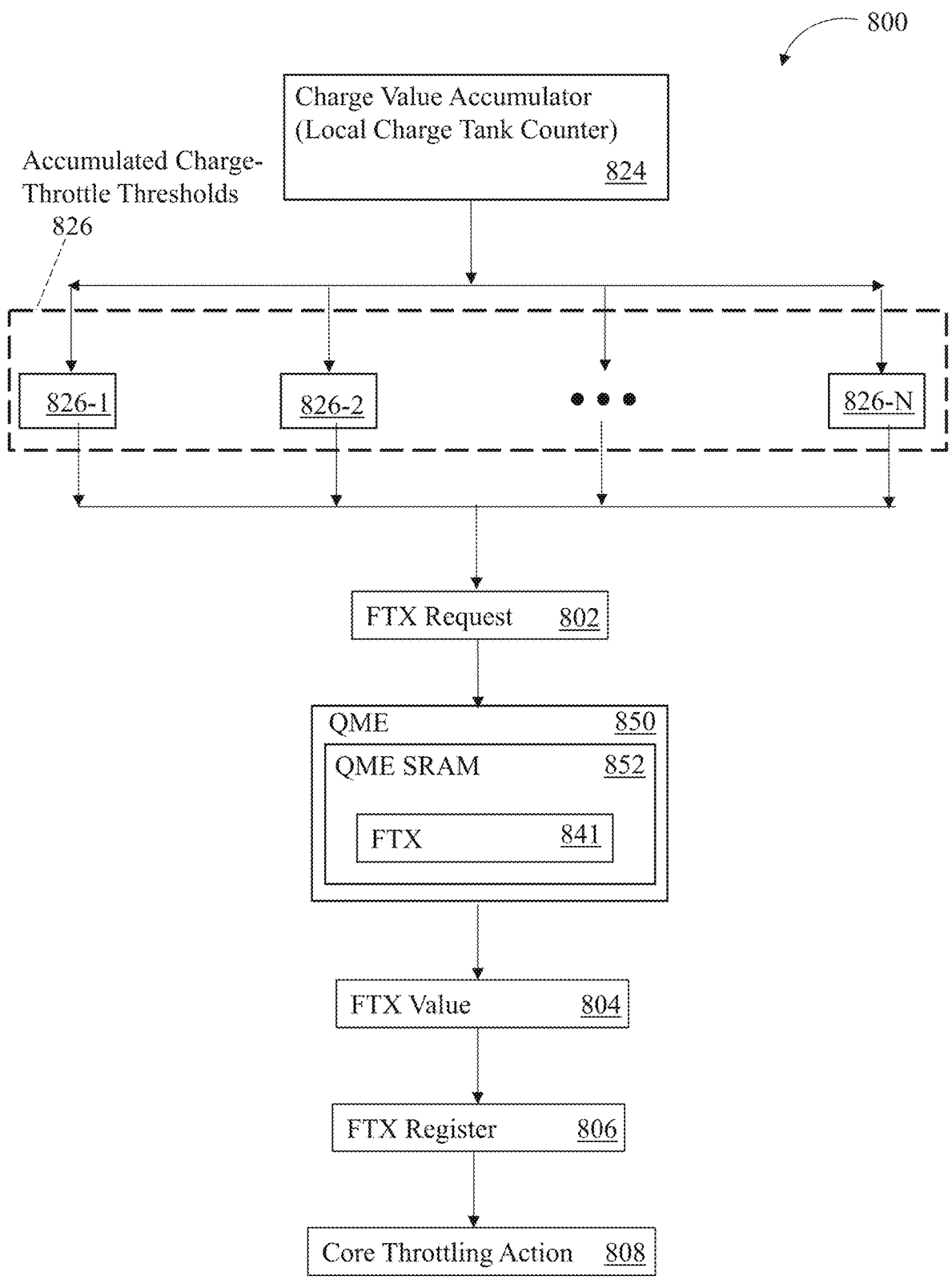
FIG. 8 is a block schematic diagram illustrating processor core throttling features, in accordance with some embodiments of the present disclosure.

Referring to FIG. 8, a block schematic diagram is provided illustrating the processor core throttling features 800 associated with the OCP control logic 700 (as shown in FIG. 7), in accordance with some embodiments of the present disclosure. The FTX 841, QME 850, and QME SRAM 852 are substantially similar to the similarly numbered components shown in FIG. 6. The charge value accumulator 824 is substantially similar to the similarly numbered component shown in FIG. 7. In at least some embodiments, the fine throttle index (FTX) 841 (as described with respect to FIG. 5) is proportional to the charge deficit of the charge value accumulator 824 as measured by the charge value accumulator 824 (local charge tank counter). Therefore, as the charge level in the charge value accumulator 824 changes, the respective throttle state is adjusted, i.e., modulated accordingly. For example, if the charge deficit of the respective charge value accumulator 824 increases (indicative of increasing processing core activity), the respective throttling will increase to reduce the power consumption of the respective processor core. Similarly, if the charge deficit of the respective charge value accumulator 824 decreases (indicative of decreasing processing core activity), the respective throttling will decrease to increase the power consumption of the respective processor core. In addition, when the charge value accumulator 824 has obtained sufficient charge credit, the throttle is removed.

More specifically, as the charge deficit as measured by the charge value accumulator 824 changes, a determination is made as to whether the value of accumulated charges have increased to or beyond a respective threshold 826. As shown in FIG. 8, a plurality of accumulated charge-based throttle thresholds 826-1 through 828-N are provided in increasing severity of the value of the accumulated charges, where N is any integer that enables operation of the OCP control logic 700 as described herein. As the value of the threshold 826 increases with the value of accumulated charges in the respective charge value accumulator 824, the magnitude of the throttling action will be increased. As such, once one of the thresholds 826 have been reached or exceeded, the charge value accumulator 824 transmits an FTX request 802 for a throttle adjustment. The FTX request 802 is transmitted to the FTX 841 resident within the QME SRAM 852 and the requested FTX value 804 is transmitted to a FTX register 806 and core throttling action 808 is initiated. See FIG. 4 for a more detailed discussion of the throttling process, including the details with respect to the DTC sequencer module 478.

Additionally, in some embodiments, the processor core's activity levels may experience bursts of processing activity based on a burst of instructions to process. Such processing activity bursts are known and the equivalent charge accumulation rates are also known such that the rate at which the respective charge value accumulator 824 is filling can be ascertained. Therefore, in some embodiments, as the equivalent charge values for the processor activities are accumulating, the OCP control logic 700 includes sufficient capabilities to increase the core throttling commensurate with the present level of accumulated charge value. Accordingly, the charge depletion in the respective charge value accumulator 824 may be anticipated, i.e., predicted, such that preemptive throttling action may be applied.

Figure 9:
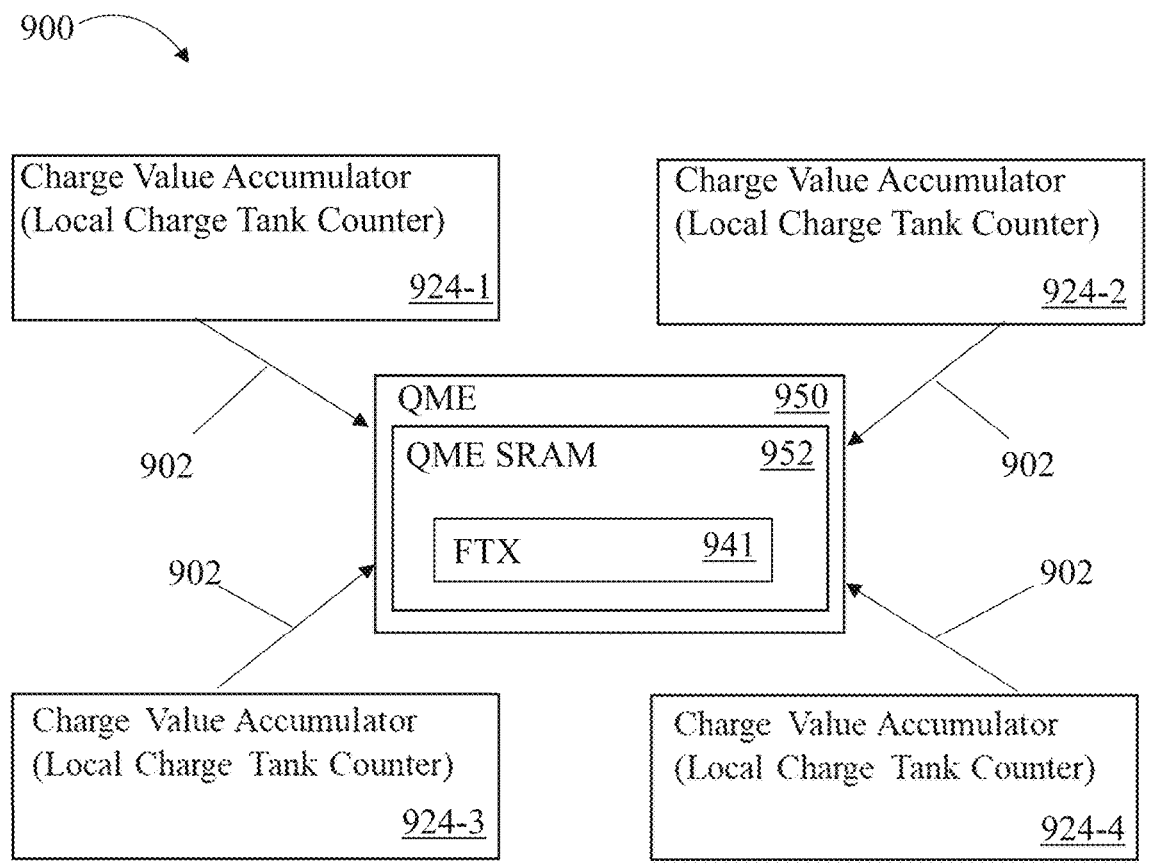
FIG. 9 is a block schematic diagram further illustrating processor core throttling features, in accordance with some embodiments of the present disclosure.

Referring to FIG. 9, a block schematic diagram is provided further illustrating the processor core throttling features 900 associated with the OCP control logic 700 (as shown in FIG. 7) and the throttle logic 800 (shown in FIG. 8), in accordance with some embodiments of the present disclosure. The FTX 941, QME 950, and QME SRAM 952 are substantially similar to the similarly numbered components shown in FIG. 8. The charge value accumulators (local charge tank counters) 924-1 through 924-4 are substantially similar to the similarly numbered components in FIG. 8. The throttling values are pulled from the fine throttle index (FTX) 941 resident within the QME SRAM 952 that was previously described. For those circumstances where more than one of the four processing cores 636 (see FIG. 6) are experiencing "bursty" processing activity, the QME 950, through the cores' respective core power management satellite (CPMS) modules 654, arbitrates the requests to refill the charge value accumulators 924 per their respective counter's 926 charge credit requests 902. For those processing devices that include, e.g., and without limitation, 8 quad core chiplets, the OCP throttle logic arbitrates between the 8 QMEs. For those circumstances where the OCP control logic 700 (see FIG. 7) determines that the charge value accumulator's 924 credits cannot be replenished fast enough through the global charge tank counter 742, and the depletion rate is such that the OCP control logic 700 predicts a voltage droop is imminent, the OCP control logic 700 proactively engages the fine throttle index 941 to more aggressively select the throttling states that are necessary for preventing the voltage droop conditions.

Figure 10:
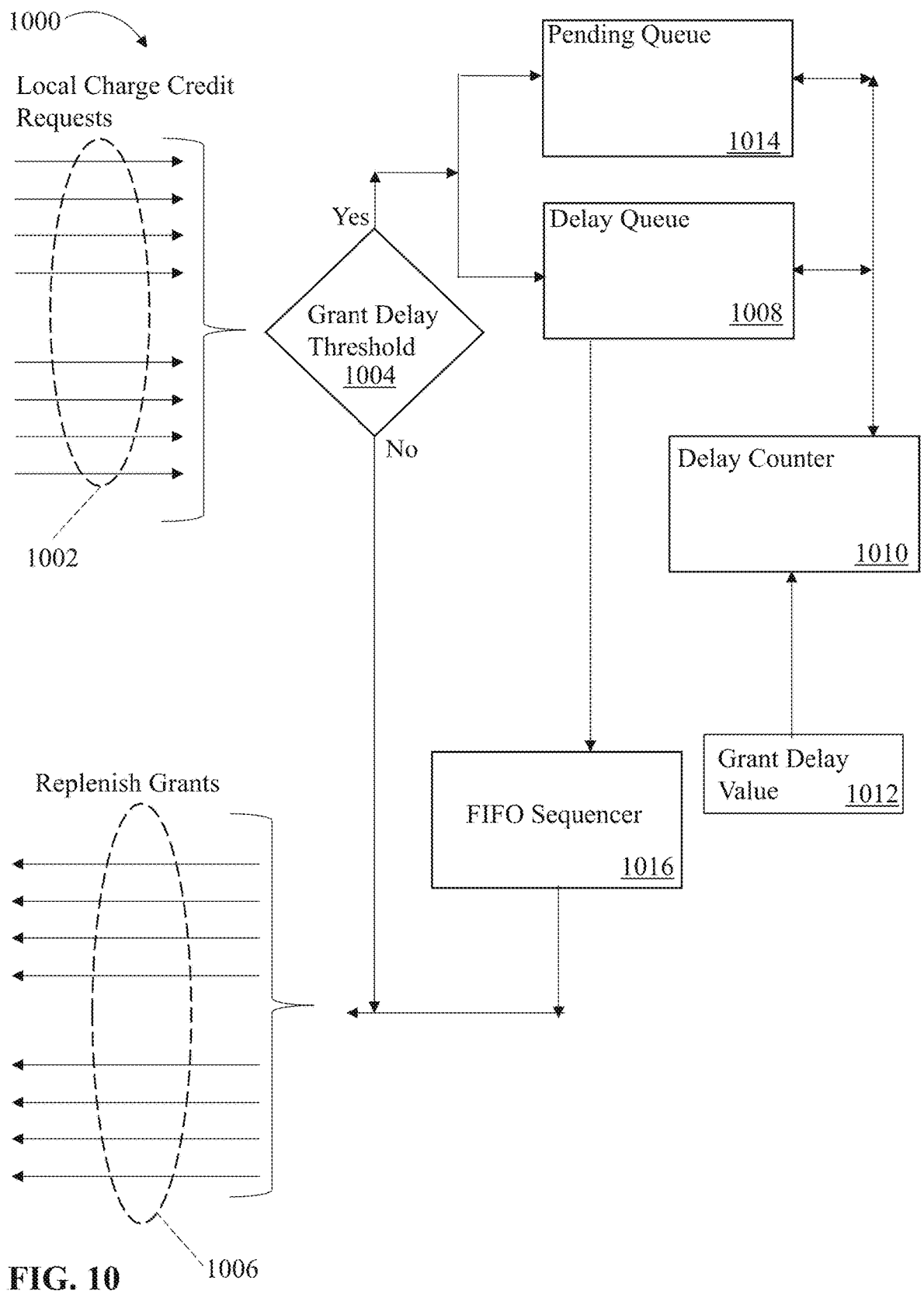
FIG. 10 is a block schematic diagram illustrating OCP control logic delay features, in accordance with some embodiments of the present disclosure.

Referring to FIG. 10, a block schematic diagram is presented illustrating OCP control logic delay features 1000, in accordance with some embodiments of the present disclosure. In one or more embodiments, the CPMS modules 454 within the respective QMEs 450 also control the aforementioned delays when the global charge tank counter 740 shows a global charge deficit. The QME 450, through the respective CPMS modules 454 for the affected processor cores 636, will delay granting local charge credit requests 1008 for the respective processor cores through programmable temporal delay periods. Such action facilitates recharging, i.e., replenishment of the global charge tank counter 740. At least a portion of the OCP control logic delay features 1000 are controlled through the request receipt/grant/delay module 706 (shown in FIG. 7).

When one or more requests 1002 (where 8 as shown is nonlimiting) for a local charge credit from the plurality of charge value accumulators 724 for the plurality of respective processor cores 636 is received by the global charge tank counter 740, a determination 1004 is made with respect to whether the total volume of the requests 1002 exceed a global charge deficit threshold. If the determination 1004 generates a "No" response, the respective grants 1006 (where 8 as shown is nonlimiting) will be generated and transmitted to the respective charge value accumulators 724. If the response to the determination is "Yes," the total volume of the requests 1002 exceeds the global charge deficit threshold, a delayed grant will ensue. The transmission of the requests 1002 will be sent to a delay queue 1008, and will start a delay counter 1010 for the respective processor core. The delay counter 1010 will "hold" the respective request 1002 for a duration defined by a programmable and adjustable grant delay value 1012. That particular charge credit request 1002 will be held by the delay queue 1008 for at least one delay count before the respective grant 1006 is transmitted from the global charge tank counter 740. If the charge credit request 1002 arrives and the grant delay counter 1010 has already started, the charge credit request 1002 will be transmitted to a pending queue 1014 before going into the delay queue 1008, and the charge credit request 1002 must wait until the delay counter 1010 resets to zero and the subsequent at least one delay count is complete. Upon completion of the delay count, the local charge credit request 1002 is granted through a first-in-first-out (FIFO) sequencer 1016, and the refill grants 1006 are transmitted to the respective charge value accumulator 724. In some embodiments, the temporal length of the issued delay is at least partially proportional to the total volume of the pending charge requests 1002 from all four processor cores 636. The delays directed toward refilling the charge value accumulators s 724 facilitates the use of more aggressive throttling due to the increasing charge deficits in the respective charge value accumulators 724. Accordingly, the grant delays as described herein facilitate decreasing the present power consumption of the affected processor cores through increasing throttling while the backlog of replenish grants accumulates.

Figure 11:
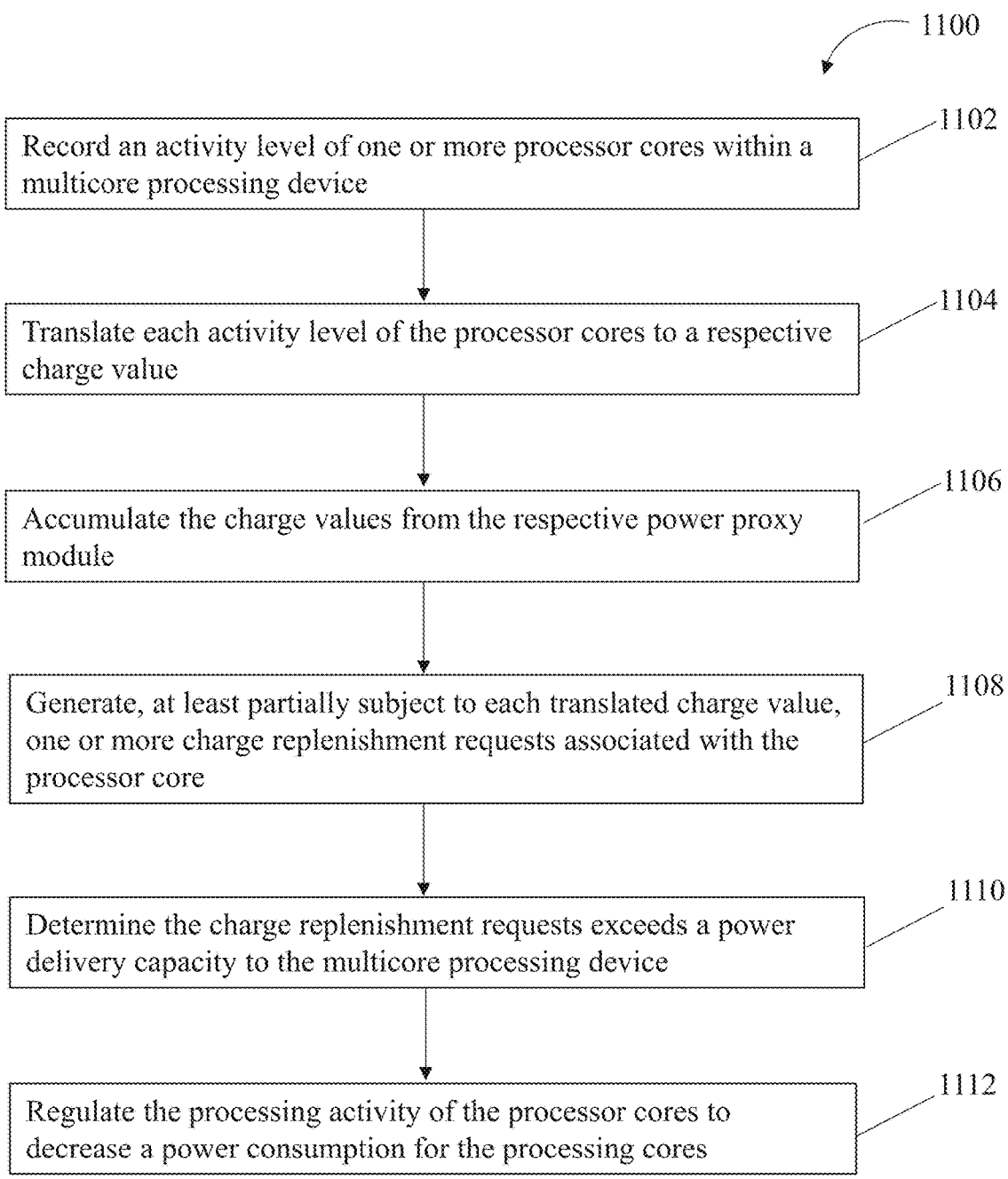
FIG. 11 is a flowchart illustrating a process for energy management of the cores in a multicore processing device, in accordance with some embodiments of the present disclosure.

Referring to FIG. 11, a flowchart is provided illustrating a process 1100 for energy management of the processor cores in a multicore processing device, in accordance with some embodiments of the present disclosure. The process 1100 includes recording 1102 an activity level of a respective processor core 336 of one or more processor cores 336-1 through 336-4 of a multicore processing device 204 through a hardware-based control system, i.e., the overcurrent predict (OCP) system 600 and its associated OCP control logic 700 architecture. The activity level recording 1102 step is executed through one or more power proxy modules, e.g., 672-1 through 672-4. Each of the power proxy modules 672-1 through 672-4 is configured to translate 1104 each activity level of the processor cores 336-1 through 336-4 to a respective charge value this is transmitted to a respective charge value accumulator 724. Each charge value accumulator 724 is configured to accumulate 1106 the charge values from the respective power proxy module 724 and generate 1108, at least partially subject to the accumulated charge values, one or more charge replenishment requests 748 associated with the respective processor core 336. In addition, the overcurrent predict (OCP) system 600 and its associated OCP control logic 700 are configured to determine 1110 the charge replenishment requests 748 exceed a power delivery capacity to the multicore processing device 204 and regulate 1112 the processing activity of the processor cores 336 to decrease a power consumption for the processing cores 336. Such decreasing of the power consumption includes delaying grants of the requests, thereby incurring increased core throttling.

The system and method as disclosed and described herein are configured for energy management of one or more processor cores, and the embodiments disclosed herein provide an improvement to computer technology. For example, the embodiments described herein use a hardware-based control scheme that reduces need for further straining the resources of the microarchitectural microprocessor hardware. Moreover, the embodiments described herein enable power-capping the microprocessor based on the global energy replenishment rate through one or more VRMs. Therefore, the energy budget managed by the global charge tank counter is at least partially controlled by the global replenishment rate, and can be set accordingly for unique system configurations and environments. Furthermore, the on-chip model described herein is constructed of modeled charge consumption and replenishment for substantially the full spectrum of possible instruction processing and environmental conditions, such as, and without limitation, VRM performance. The global charge tank counter models current delivery from the external VRM, and is replenished at a programmable interval. Each local counter requests credit from the global counter and tracks core activity relative to the credit received.

In addition, further improvement of computer technology is achieved through facilitating a microprocessor modeling its power consumption and predicting when such power consumption will exceed the respective system's power delivery capacity. The power consumption is monitored through measuring local core activity through a per-core digital power proxy that approximates the energy the core consumes.

Moreover, if the global charge-tank counter shows a charge deficit, it will delay granting local credit requests. In addition, a portion of the global energy control scheme includes using a runtime fine-grained core throttle technique that is configured to reduce core power consumption to fit within the energy budget. The throttle index is proportional to the local credit deficit. Specifically, core throttling may be used to further control the power consumption of the core to minimize a potential for voltage droop conditions. If the local counter's credits cannot be replenished fast enough from the global counter, the OCP control logic predicts a voltage droop is imminent and pro-actively engages an indexed core throttle to prevent a voltage droop.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for managing energy consumption of a plurality of processor cores in a multicore processing device comprising:
   a hardware-based control system comprising:
      one or more power proxy modules, wherein each power proxy module of the one or more power proxy modules is configured to:
         translate an activity level of one or more processor cores to a charge value;
      one or more charge value accumulators, wherein each charge value accumulator of the one or more charge value accumulators is communicatively coupled to a respective power proxy module, each charge value accumulator is configured to:
         accumulate the charge values from the respective power proxy module; and
         generate, at least partially subject to the accumulated charge values, one or more charge replenishment requests associated with the respective one or more processor cores;
      a delay queue configured to receive the one or more charge replenishment requests, wherein the delay queue is operably coupled to the one or more charge value accumulators; and
      a pending queue configured to receive the charge replenishment requests prior to the delay queue, wherein the pending queue is communicatively coupled to the delay queue.

2. The system of claim 1, wherein the hardware-based control system is configured to:
   record an activity level of a respective processor core of the one or more processor cores;
   determine the one or more charge replenishment requests exceeds a power delivery capacity to the multicore processing device;
   model a power consumption of the multicore processing device; and
   predict when the modeled power consumption will exceed the respective power delivery capacity to the multicore processing device.

3. The system of claim 2, wherein the hardware-based control system is further configured to:
   predict voltage droop conditions.

4. The system of claim 2, wherein the hardware-based control system is further configured to:
   model charge depletion and charge replenishment for each processor core of the one or more processor cores.

5. The system of claim 1, further comprising:
   a quad management engine (QME) comprising one or more QME static random access memories (SRAM), wherein the QME is operably coupled to the one or more processor cores and the hardware-based control system.

6. The system of claim 5, wherein the QME SRAM is configured to:
   maintain a table of processor throttling states resident thereon, the table of processor throttling states being empirically generated, wherein at least a portion of the table of processor core throttling states defines a substantially linear relationship with respect to associated power consumption values of the at least one processor core of the one or more processor cores.

7. The system of claim 6, wherein the hardware-based control system is further configured to:
  modulate the respective processor core throttling states to configure the at least one processor core of the one or more processor cores to consume the power value associated with the respective processor core throttling states.

8. The system of claim 7, wherein the hardware-based control system further comprises:
  the one or more charge value accumulators are communicatively and operably coupled to a global charge tank counter, each charge value accumulator of the one or more charge value accumulators further configured to receive one or more charge replenishments from the global charge tank counter.

9. The system of claim 6, wherein:
  the table of processor core throttling states comprises a fine throttle index, wherein the fine throttle index is proportional to a local charge credit deficit for each processor core of the one or more processor cores.

10. The system of claim 1, further comprising a global charge tank counter, wherein the hardware-based control system is further configured to:
  transmit one or more charge replenishment requests from the one or more charge value accumulators to the global charge tank counter.

11. A computer-implemented method for managing energy consumption of one or more processor cores comprising:
  translating an activity level of one or more processor cores to a charge value;
  generating, at least partially subject to the translated charge value, one or more charge replenishment requests associated with the one or more processor cores; and
  transmitting the one or more charge replenishment requests to a pending queue prior to a delay queue.

12. The method of claim 11, further comprising:
  recording an activity level of the one or more processor cores within a multicore processing device;
  determining the one or more charge replenishment requests exceeds a power delivery capacity to the multicore processing device;
  modeling a power consumption of the multicore processing device; and
  predicting when the modeled power consumption will exceed the respective power delivery capacity to the multicore processing device.

13. The method of claim 12, wherein predicting when the modeled power consumption will exceed the respective power delivery capacity comprises:
  predicting a voltage droop condition.

14. The method of claim 12, wherein predicting when the modeled power consumption will exceed the respective power delivery capacity comprises:
  modeling charge depletion and charge replenishment for each processor core of the one or more processor cores.

15. The method of claim 11, further comprising:
  empirically generating a table of processor core throttling states, wherein at least a portion of the table of processor core throttling states defines a substantially linear relationship with respect to associated power consumption values of the at least one processor core of the one or more processor cores; and
  modulating the respective processor core throttling states to configure the at least one processor core of the one or more processor cores to consume the power value associated with the respective processor core throttling states.

16. The method of claim 15, wherein:
  the table of processor core throttling states comprises a fine throttle index, wherein the fine throttle index is proportional to a local charge credit deficit for each processor core of the one or more processor cores.

17. The method of claim 11, wherein the generating one or more charge replenishment requests directed toward the one or more processor cores comprises:
  transmitting one or more charge replenishment requests from one or more charge value accumulators to a global charge tank counter.

18. The method of claim 17, further comprising:
  receiving, by the one or more charge value accumulators, one or more charge replenishments from the global charge tank counter.

19. The method of claim 11, further comprising:
  transmitting the one or more charge replenishment requests to the delay queue when a global charge tank counter shows a global charge deficit.

20. The method of claim 11, wherein the transmitting the one or more charge replenishment requests to the pending queue prior to the delay queue comprises:
  initiating a grant delay counter for one or more first charge replenishment requests previously sent to the delay queue;
  transmitting the one or more second charge replenishment requests to the pending queue;
  resetting the grant delay counter to zero;
  transmitting, based on the one or more first charge replenishment requests in the delay queue, one or more refill grants to the respective charge value accumulator; and
  transmitting the one or more second charge replenishment requests from the pending queue to the delay queue.

* * * * *